United States Patent
Tsukada et al.

(10) Patent No.: US 12,125,288 B2
(45) Date of Patent: Oct. 22, 2024

(54) POSITION MEASURING METHOD, DRIVING CONTROL METHOD, DRIVING CONTROL SYSTEM, AND MARKER

(71) Applicant: NIPPON TELEGRAPH AND TELEPHONE CORPORATION, Tokyo (JP)

(72) Inventors: Shingo Tsukada, Musashino (JP); Hiroshi Nakashima, Musashino (JP); Toichiro Goto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 402 days.

(21) Appl. No.: 17/595,102

(22) PCT Filed: May 21, 2019

(86) PCT No.: PCT/JP2019/020128
§ 371 (c)(1),
(2) Date: Nov. 9, 2021

(87) PCT Pub. No.: WO2020/235004
PCT Pub. Date: Nov. 26, 2020

(65) Prior Publication Data
US 2022/0215669 A1    Jul. 7, 2022

(51) Int. Cl.
*G06V 20/56* (2022.01)
*B60W 60/00* (2020.01)

(52) U.S. Cl.
CPC .......... *G06V 20/56* (2022.01); *B60W 60/001* (2020.02); *B60W 2420/403* (2013.01); *B60W 2554/4041* (2020.02); *B60W 2554/4044* (2020.02)

(58) Field of Classification Search
CPC .............. G06V 20/56; B60W 60/001; B60W 2420/403; B60W 2554/4041; B60W 2554/4044; G01B 11/00; G05D 1/02
USPC ......................................................... 382/104
See application file for complete search history.

(56) References Cited

U.S. PATENT DOCUMENTS

| 9,910,158 B2 * | 3/2018 | Rudow ................... G01S 19/07 |
| 10,192,133 B2 * | 1/2019 | Yang .......................... G06T 7/73 |
| 2005/0069196 A1 * | 3/2005 | Uchiyama ................ G06T 7/70 |
| | | 382/154 |

(Continued)

FOREIGN PATENT DOCUMENTS

| JP | H0261704 A | 3/1990 |
| JP | 08219775 A * | 8/1996 |

(Continued)

OTHER PUBLICATIONS

Yoshiaki Shirai and Yuichi Ohta, Sensing Technology for Automatic Land Vehicle, Journal of the Robotics Society of Japan, vol. 5, No. 5, 1987, pp. 391-397.

(Continued)

*Primary Examiner* — Mahendra R Patel
(74) *Attorney, Agent, or Firm* — Harness, Dickey & Pierce, P.L.C.

(57) ABSTRACT

A position measurement method includes a step of acquiring an image of the surroundings at a self-position, a step of detecting an area in which a circular shape appears in the image, and a step of measuring the self-position based on the aspect ratio of the area.

14 Claims, 23 Drawing Sheets

(56) References Cited

U.S. PATENT DOCUMENTS

| | | | | |
|---|---|---|---|---|
| 2006/0088202 A1* | 4/2006 | Venkatachalam | ......... | G06T 5/77 |
| | | | | 382/152 |
| 2006/0177101 A1* | 8/2006 | Kato | ...................... | G01C 11/02 |
| | | | | 356/3 |
| 2008/0109184 A1* | 5/2008 | Aratani | ..................... | G06T 7/73 |
| | | | | 702/153 |
| 2019/0354742 A1* | 11/2019 | Murakoshi | ............. | G06V 20/64 |

FOREIGN PATENT DOCUMENTS

| JP | H08219775 A | | 8/1996 | | |
|---|---|---|---|---|---|
| JP | 2001194141 A | * | 7/2001 | | |
| JP | 4450532 B2 | * | 4/2010 | | |
| JP | 2010237169 A | * | 10/2010 | ........... | G01C 15/002 |
| JP | 2013037006 A | * | 2/2013 | ............. | G01S 5/163 |

OTHER PUBLICATIONS

Hiroaki Wagatsuma, Current status and issues of driving support /autonomous driving technology by artificial intelligence, Measurement and control, vol. 54, No. 11, 2015.

Manabu Omae and Takehiko Fujioka, Differential GPS-Based Position Measurement and Steering Control for Automatic Driving, Transactions of the Japan Society of Mechanical Engineers. Series C, vol. 65, No. 634, 1999, pp. 2371-2378.

Makoto Suzuki et al., An Indoor Autonomous Mobile System Guided by Light Markers to Assist Elderly People, Official journal of the Society of Life Support Technology, vol. 7, No. 1, 1995, pp. 11-19.

Yoshihiro Suda and Keiji Aoki, Current activities and some issues on the development of automated driving, Journal of Information Processing and Management, vol. 57, No. 11, 2015, pp. 809-817.

* cited by examiner

POSITION MEASURING METHOD, DRIVING CONTROL METHOD, DRIVING CONTROL SYSTEM, AND MARKER

CROSS-REFERENCE TO RELATED APPLICATIONS

This application is a 371 U.S. National Phase of International Application No. PCT/JP2019/020128 filed on May 21, 2019. The entire disclosures of the above applications are incorporated herein by reference.

TECHNICAL FIELD

The present invention relates to a position measurement method, a motion control method, a motion control system, and a marker.

BACKGROUND ART

In recent years, research on self-propelled robots, automatic guided vehicles, and the like has been advancing with the goal of realizing a symbiotic society between humans and robots. Also, as the population ages, research on self-driving vehicles such as automobiles, wheelchairs, and medical/welfare stretchers (e.g., moving stretchers and beds) has been advancing. Accurate and efficient self-position measurement technology is required in order to allow such devices (hereinafter collectively referred to as "mobile robots") to autonomously travel safely and quickly. Conventional examples of self-position measurement technology include a technique that uses an absolute coordinate system for setting coordinates in space, and a technique that uses a relative coordinate system for measuring the surrounding environment using coordinates centered on the mobile robot. However, each technique has advantages and disadvantages.

For example, NPL 1 describes a mobile robot that includes an ultrasonic radar or triangulation type of distance measuring sensor, an electromagnetic wave type proximity sensor, a camera image processing device, or the like. However, in order for such a mobile robot to travel autonomously, it is necessary to provide a large number of sensors and to customize the design according to the surrounding environment. This causes problems such as an increase in equipment cost and a decrease in mobile robot versatility. As another example, NPL 2 describes an automated driving technique that uses machine learning. However, although recent machine learning techniques are highly developable and flexible, there is a problem that the equipment cost related to learning and arithmetic processing increases.

As another example, NPL 3 describes an absolute coordinate system-based self-position measurement technique that uses GPS (Global Positioning System) and uses the arrangement and reading of markers that indicate positions (absolute coordinates) in space. As yet another example, NPL 4 describes a technique in which autonomous travel is realized using line markers that are drawn on the floor along movement lines, light sources that are disposed as markers, or markers such as two-dimensional barcodes that are disposed at regular intervals. However, these techniques have problems such as spoiling the aesthetic appearance in a facility or a general house in particular, and erroneous recognition and measurement failure caused by soiling of the markers, for example.

CITATION LIST

Non Patent Literature

[NPL 1] Yoshiaki SHIRAI, Yuichi OHTA, "Sensing Technology for Automatic Land Vehicle", Journal of the Robotics Society of Japan, Volume 5, Issue 5, pp. 391-397, October 1987.

[NPL 2] Hiroaki WAGATSUMA, "Artificial Intelligence for Autonomous Cars and Mobility Services: Trends and Perspectives", Journal of The Society of Instrument and Control Engineers, Volume 54, Issue 11, pp. 808-815, November 2015.

[NPL 3] Manabu OMAE, Takehiko FUJIOKA, "Differential GPS-Based Position Measurement and Steering Control for Automatic Driving", Transactions of the Japan Society of Mechanical Engineers (Series C), Volume 65, Issue 634, pp. 2371-2378, June 1999.

[NPL 4] Makoto SUZUKI, Kazutoshi OKAMOTO, Takeyoshi DOHI, Hideo YANO, "An Indoor Autonomous Mobile System Guided by Light Markers to Assist Elderly People", JLSTS, Volume 7, No. 1, pp. 11-19, February 1995.

[NPL 5] Yoshihiro SUDA, Keiji AOKI, "Current Activities and Some Issues on the Development of Automated Driving", Journal of Information Processing and Management, Volume 57, No. 11, pp. 809-817, February 2015.

SUMMARY OF THE INVENTION

Technical Problem

In light of the above circumstances, an object of the present invention is to provide a technique capable of suppressing a decrease in self-position measurement efficiency.

Means for Solving the Problem

One aspect of the present invention is a position measurement method including: an image acquiring step of acquiring an image of surroundings at a self-position; an image analyzing step of detecting an area in which a circular shape appears in the image; and a self-position measuring step of measuring the self-position based on a feature amount including an aspect ratio of the area.

Another aspect of the present invention is the above position measurement method, wherein in the self-position measuring step, a relative angle between a direction of the circular shape and a traveling direction is calculated based on the aspect ratio.

Another aspect of the present invention is the above position measurement method, wherein in the self-position measuring step, the distance from the self-position to the circular shape is measured based on the size of the area.

Another aspect of the present invention is a driving control method including: an image acquiring step of acquiring an image of surroundings at a self-position; an image analyzing step of detecting an area in which a circular shape appears in the image; a self-position measuring step of measuring the self-position based on a feature amount including an aspect ratio of the area; and a driving controlling step of controlling autonomous traveling based on the measured self-position.

Another aspect of the present invention is the above driving control method, wherein in the driving controlling step, autonomous traveling is controlled such that the distance from a wall surface is maintained at a predetermined distance.

Another aspect of the present invention is a driving control system including a self-position measuring device and a driving control device, the self-position measuring device including: an image acquisition unit configured to acquire an image of surroundings at a self-position; an image analysis unit configured to detect an area in which a circular shape appears in the image; and a self-position measuring unit configured to measure the self-position based on a feature amount including an aspect ratio of the area, and the driving control device including: a driving control unit configured to control traveling based on the self-position measured by the self-position measuring unit.

Another aspect of the present invention is a marker to be captured in an image by a self-position measuring device that acquires an image of surroundings at a self-position, detects an area in which a circular shape appears in the image, and measures the self-position based on a feature amount including an aspect ratio of the area, the marker being disposed in a state of being covered by a transmissive object, and the marker including the circular shape.

Effects of the Invention

According to the present invention, it is possible to suppress a decrease in self-position measurement efficiency.

DESCRIPTION OF EMBODIMENTS

First Embodiment

Hereinafter, a first embodiment of the present invention will be described with reference to the drawings.

Figure 1:
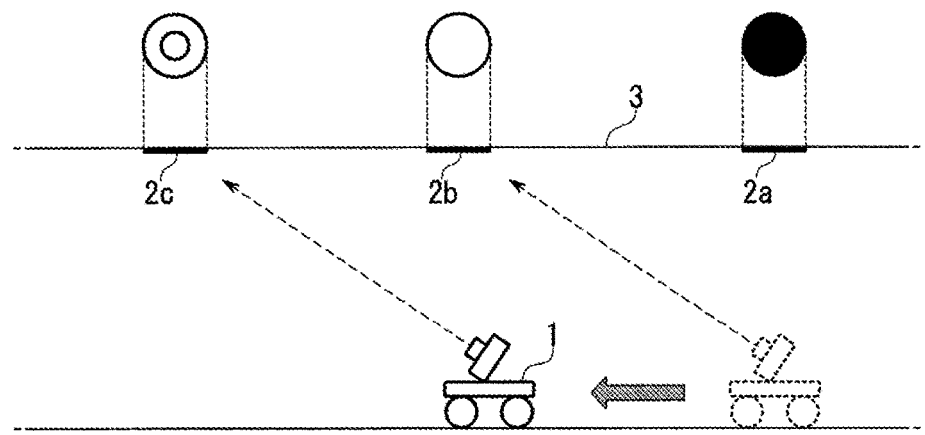
FIG. 1 is a schematic diagram showing an overview of autonomous traveling performed by a mobile robot 1 according to a first embodiment of the present invention.

FIG. 1 is a schematic diagram showing an overview of autonomous traveling performed by a mobile robot 1 according to the first embodiment of the present invention.

The mobile robot 1 according to the first embodiment of the present invention is a robot that autonomously travels in a space where a marker is provided. The mobile robot 1 includes a moving mechanism such as a carriage. Note that as shown in FIG. 1, the moving mechanism is not limited to being a mechanism that uses wheels, such as a carriage, and may be a mechanism that does not use wheels, such as a mechanism capable of bipedal walking or quadrupedal walking.

For example, as shown in FIG. 1, a marker 2a, a marker 2b, and a marker 2c (hereinafter, simply called "markers 2" when it is not necessary to distinguish between them) are arranged along a movement line on a ceiling 3 of a room, along which the mobile robot 1 moves, for example.

Also, information indicating positions (positions in an absolute coordinate system) at which the markers 2 are disposed is stored in the mobile robot 1 in advance. Note that the mobile robot 1 may be configured such that information indicating the positions where the markers 2 are disposed can be acquired from an external device or the like via a wireless communication network or the like as needed. Also, the mobile robot 1 is not necessarily required to store the positions (positions in the absolute coordinate system) of all of the markers 2 in advance, and may be configured to store a home position or departure point, the position of a marker disposed at a main destination, and the ceiling height, and not store the positions of the markers 2 along the route.

Also, information indicating a traveling route from a departure point to a destination point in autonomous traveling is stored in the mobile robot 1 in advance. Note that the mobile robot 1 may be configured such that information indicating the traveling route to the destination point can be acquired from an external device or the like via a wireless communication network or the like as needed.

The mobile robot 1 is provided with an optical sensor such as a camera. Accordingly, the mobile robot 1 can acquire images of the surroundings at its current position (hereinafter, referred to as the "self-position"). The mobile robot 1 attempts to detect the area where the markers 2 appear in the acquired images. If the mobile robot 1 detects an area where a marker 2 appears, it is possible to specify which marker 2 the detected marker 2 is by performing image analysis on the detected area (e.g., by identifying the appearance of the marker 2).

For example, as shown in FIG. 1, the marker 2a is a filled circular marker. Also, the marker 2b is an unfilled circular (annular) marker. Further, the marker 2c is a circular (concentric) marker made up of two circles. In this way, the appearances of the markers 2 are different from each other, and therefore the mobile robot 1 can identify which marker 2 appears in a captured image through image analysis. Then, the mobile robot 1 can specify the self-position in the absolute coordinate system by referencing information that indicates the position of the specified marker 2.

Note that image analysis can be performed using a general-purpose technique such as OCR (Optical Character Recognition/Reader).

It should also be noted that the markers 2 may all have the same appearance. In this case, the mobile robot 1 specifies the positions (absolute coordinates) of the markers 2 by comparing the positional relationship between the detected markers 2 with an environment map stored in advance, for example. Accordingly, the mobile robot 1 can specify the self-position in the absolute coordinate system. Note that the environment map referred to here is a map that includes information on the surrounding environment such as the arrangement of objects and walls.

The mobile robot 1 performs image analysis on a detected area and measures the aspect ratio of the area (i.e., the aspect ratio of the marker 2 in the captured image). The mobile robot 1 calculates a relative angle (vertical angle) between the marker 2 and the self-position based on the measured aspect ratio.

Note that the mobile robot 1 may be configured to perform image analysis on the detected area and calculate the linear distance between the detected marker 2 and the self-position based on the size of the area. In this case, the mobile robot 1 calculates the linear distance by measuring the longer diameter of the marker 2, for example. By calculating the linear distance between the marker 2 and the self-position, the mobile robot 1 can recognize the self-position more accurately.

The mobile robot 1 measures the horizontal distance between the markers 2 and the self-position based on the calculated relative angle and pre-stored information that indicates the ceiling height and the camera installation height. The mobile robot 1 measures the self-position (in an absolute coordinate system) based on the information indicating the positions of the markers 2 (in the absolute coordinate system) and the measured horizontal distance. The mobile robot 1 travels autonomously while controlling the traveling direction based on the measured self-position and the pre-stored information indicating the traveling route to the destination point.

Figure 2:
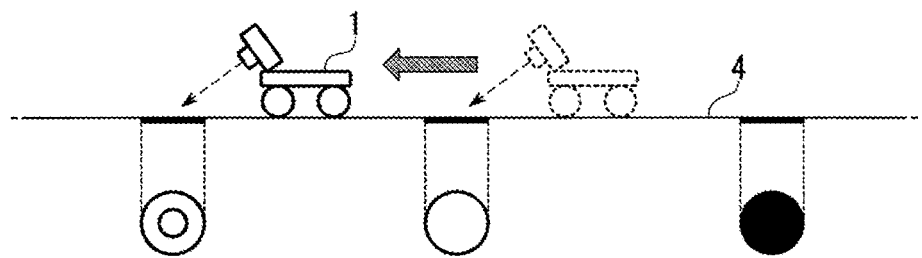
FIG. 2 is a schematic diagram showing an overview of autonomous traveling performed by the mobile robot 1 according to the first embodiment of the present invention.

Note that the mobile robot 1 may be configured to measure the self-position by detecting an area where a marker 2 disposed on the floor surface 4 appears in an acquired image as shown in FIG. 2.

Figure 3:
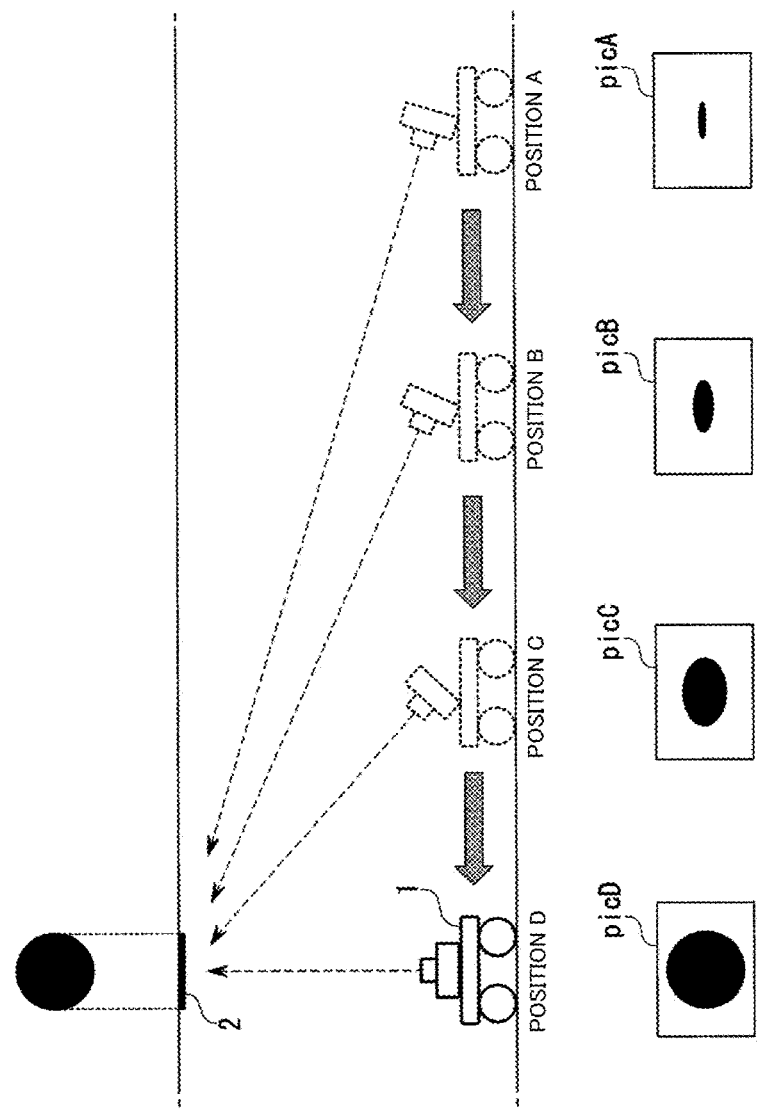
FIG. 3 is a schematic diagram showing differences between images of a marker 2 according to the position of the mobile robot 1 in the first embodiment of the present invention.

FIG. 3 is a schematic diagram showing differences between images of a marker 2 according to the position of the mobile robot 1. Here, picA, picB, picC, and picD shown in FIG. 3 are images captured by the mobile robot 1. Also, picA, picB, picC, and picD are images captured when the mobile robot 1 was located at positions A, B, C, and D, respectively.

As shown in FIG. 3, as the mobile robot 1 travels and approaches a position directly below the marker 2 (position D), the relative angle between the traveling direction of the mobile robot 1 and the direction from the mobile robot 1 to the marker 2 (vertical angle) approaches 90 degrees (vertical). In other words, when the mobile robot 1 is located at the position D directly below the marker 2, the relative angle is 90 degrees.

Also, as shown in FIG. 3, as the mobile robot 1 travels and approaches the position directly below the marker (position D), the aspect ratio of the area in which the marker 2 appears in the image approaches 1:1 (i.e., the shape of the marker 2 approaches a perfect circle). Further, as the mobile robot 1 travels and approaches the position directly below the marker 2 (position D), the size of the area in which the marker 2 appears in the image becomes larger.

Figure 4:
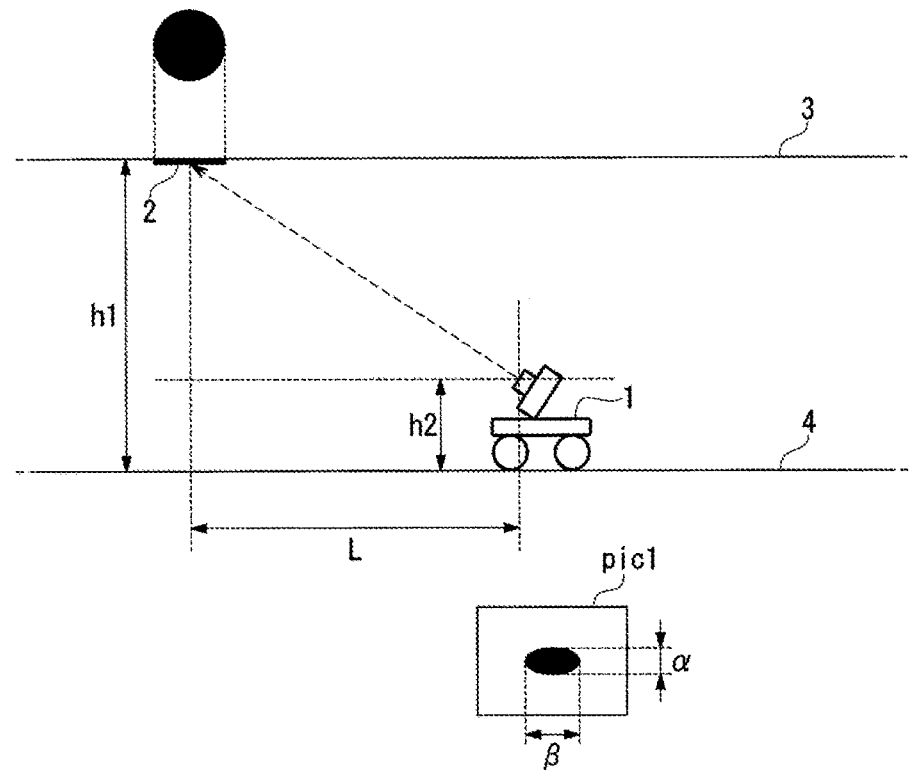
FIG. 4 is a schematic diagram for describing an example of horizontal distance measurement performed by the mobile robot 1 according to the first embodiment of the present invention.

FIG. 4 is a schematic diagram for describing an example of horizontal distance measurement performed by the mobile robot 1 according to the first embodiment of the present invention.

As shown in FIG. 4, the distance from a floor surface 4 to the ceiling 3 (i.e., the ceiling height) is h1. Also, the distance from the floor surface 4 to the camera (i.e., the installation height of the camera) is h2. Further, the aspect ratio of the area in which the marker 2 appears in the captured image pic1 is $\alpha:\beta$, (short side: $\alpha$, long side: $\beta$). In this case, a horizontal distance L between the position of the mobile robot 1 (of the camera) and the position of the marker 2 can be calculated by the following expression (1).

[Math 1]

$$L = (h1 - h2)\frac{\sqrt{\beta^2 - \alpha^2}}{\alpha} \tag{1}$$

Note that in an environment where the ceiling height differs depending on the position in the space, a configuration is possible in which, for example, the appearance of the marker 2 is changed according to the ceiling height, and the mobile robot 1 can recognize the ceiling height at the positions where the markers 2 are disposed. Alternatively, a configuration is possible in which, for example, numbers or symbols indicating the ceiling height are provided adjacent to the markers 2, and the mobile robot 1 can recognize the ceiling height at the position of each marker 2 by reading the numbers or symbols.

Note that a configuration is also possible in which, for example, if the ceiling height on the traveling route of the mobile robot 1 is divided into three stages (e.g., 250 [cm], 230 [cm], and 200 [cm]), three different types of markers 2 are provided according to the respective ceiling heights. By recognizing the accurate ceiling height, the mobile robot 1 can measure the self-position more accurately.

[Functional Configuration of Mobile Robot]

The functional configuration of the mobile robot 1 will be described below.

Figure 5:
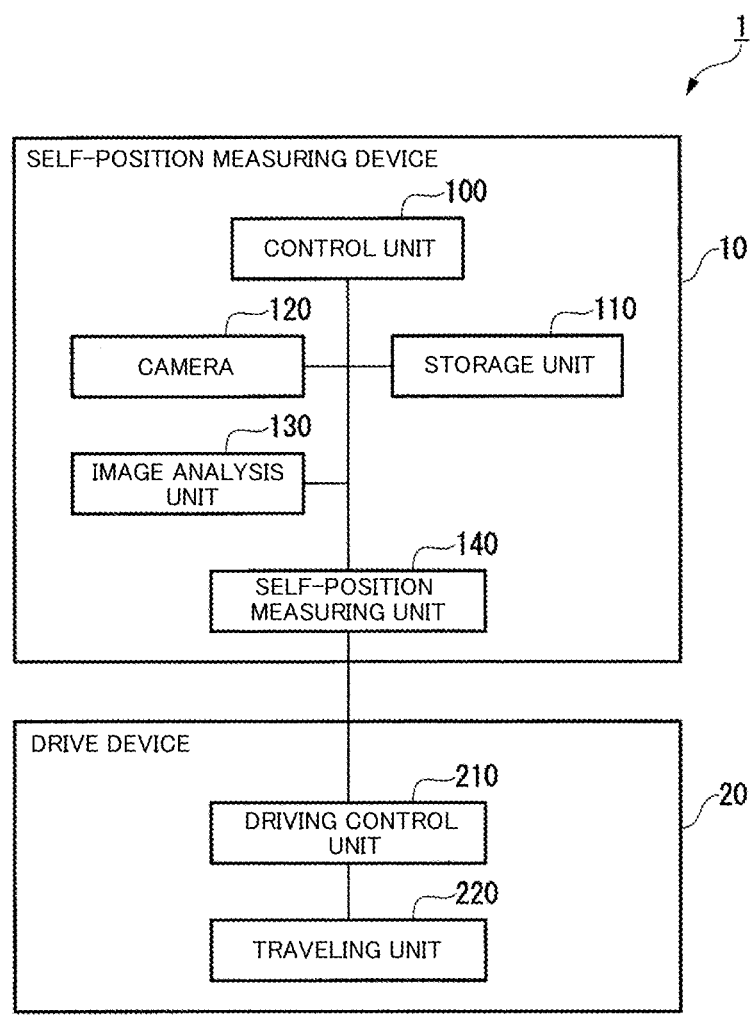
FIG. 5 is a block diagram showing a functional configuration of the mobile robot 1 according to the first embodiment of the present invention.

FIG. 5 is a block diagram showing the functional configuration of the mobile robot 1 according to the first embodiment of the present invention. The mobile robot 1 includes a self-position measuring device 10 and a drive device 20.

As shown in FIG. 5, the self-position measuring device 10 includes a control unit 100, a storage unit 110, a camera 120, an image analysis unit 130, and a self-position measuring unit 140.

The control unit 100 controls the operations of the functional blocks included in the self-position measuring device 10. The control unit 100 includes, for example, a processor such as a CPU (Central Processing Unit). For example, the control unit 100 reads and executes a program stored in advance in the storage unit 110, thereby realizing the functions controlled by the functional blocks of the self-position measuring device 10 as software. The control unit 100 may be configured to acquire the program from another device via a communication network, for example.

The storage unit 110 stores various types of data and programs used in the self-position measuring device 10. The storage unit 110 includes a storage medium such as an HDD (Hard Disk Drive), a flash memory, an EEPROM (Electrically Erasable Programmable Read Only Memory), a RAM (Random Access read/write Memory), or a ROM (Read Only Memory), or any combination of such storage media.

The storage unit 110 stores the above-described information regarding the markers 2 in advance. The information regarding the markers 2 is, for example, information indicating the appearance of the markers 2 and the positions where the markers 2 are disposed. Note that the information indicating the positions where the markers 2 are disposed may be, for example, information indicating the ceiling height of the ceiling on which the marker 2 is disposed or the width of the wall on which the marker 2 is disposed. Alternatively, the information indicating the positions where the markers 2 are disposed may be information indicating the positions of the markers 2 in the absolute coordinate system.

The storage unit 110 also stores, in advance, information indicating the installation height of the camera 120 included in the device. The storage unit 110 also stores, in advance, the above-described information indicating the traveling route from the departure point to the destination point in autonomous traveling. Note that the storage unit 110 may be configured to store a surrounding environment map in advance.

The camera 120 (image acquisition unit) captures images of the surroundings of the mobile robot 1 and generates image data. The camera 120 outputs the generated image data to the image analysis unit 130. Note that if it is known that the markers 2 are disposed on the ceiling 3, the camera 120 may be configured to perform image capturing only toward the ceiling.

The image analysis unit 130 acquires the image data output by the camera 120. The image analysis unit 130 performs image analysis on images based on the acquired image data. Through the image analysis, the image analysis unit 130 detects a circular or elliptical area in an image. The image analysis unit 130 compares the detected area with the information indicating the appearance of the markers 2 stored in the storage unit 110, and determines whether or not the detected circular or elliptical area is an area in which a marker 2 appears.

If the detected area is an area in which the marker 2 appears, the image analysis unit 130 measures the aspect ratio of the area. The image analysis unit 130 outputs information indicating the measurement result to the self-position measuring unit 140.

The self-position measuring unit 140 acquires the information that was output by the image analysis unit 130 and indicates the measurement result. The acquired information includes information that identifies the marker 2 that was specified by the image analysis unit 130 and information that indicates the aspect ratio of the area detected by the image analysis unit 130.

The self-position measuring unit 140 measures the self-position based on information regarding the aspect ratio of the area detected by the image analysis unit 130 and the surrounding environment (e.g., information indicating the ceiling height at the position where the marker 2 is disposed and the camera installation height, or information indicating the position of the marker 2 in the absolute coordinate system).

The self-position measuring unit 140 outputs, to the drive device 20, information indicating the measured self-position and information that is stored in the storage unit 110 and indicates the traveling route to the destination point. Note that the drive device 20 may have a configuration in which information indicating the traveling route to the destination point is stored therein in advance.

As shown in FIG. 5, the drive device 20 includes a driving control unit 210 and a traveling unit 220.

The driving control unit 210 acquires the information output by the self-position measuring unit 140 of the self-position measuring device 10. As described above, this information includes information indicating the self-position, information indicating the traveling route to the destination point, and the like. The driving control unit 210 controls the operation of the traveling unit 220 based on the acquired information to cause the mobile robot 1 to travel.

The traveling unit 220 operates under control of the driving control unit 210. The traveling unit 220 includes a moving mechanism that includes a drive device such as a motor or an engine and drive wheels (not shown), for example.

[Operations of Mobile Robot]

The following describes an example of operations of the mobile robot 1.

Figure 6:
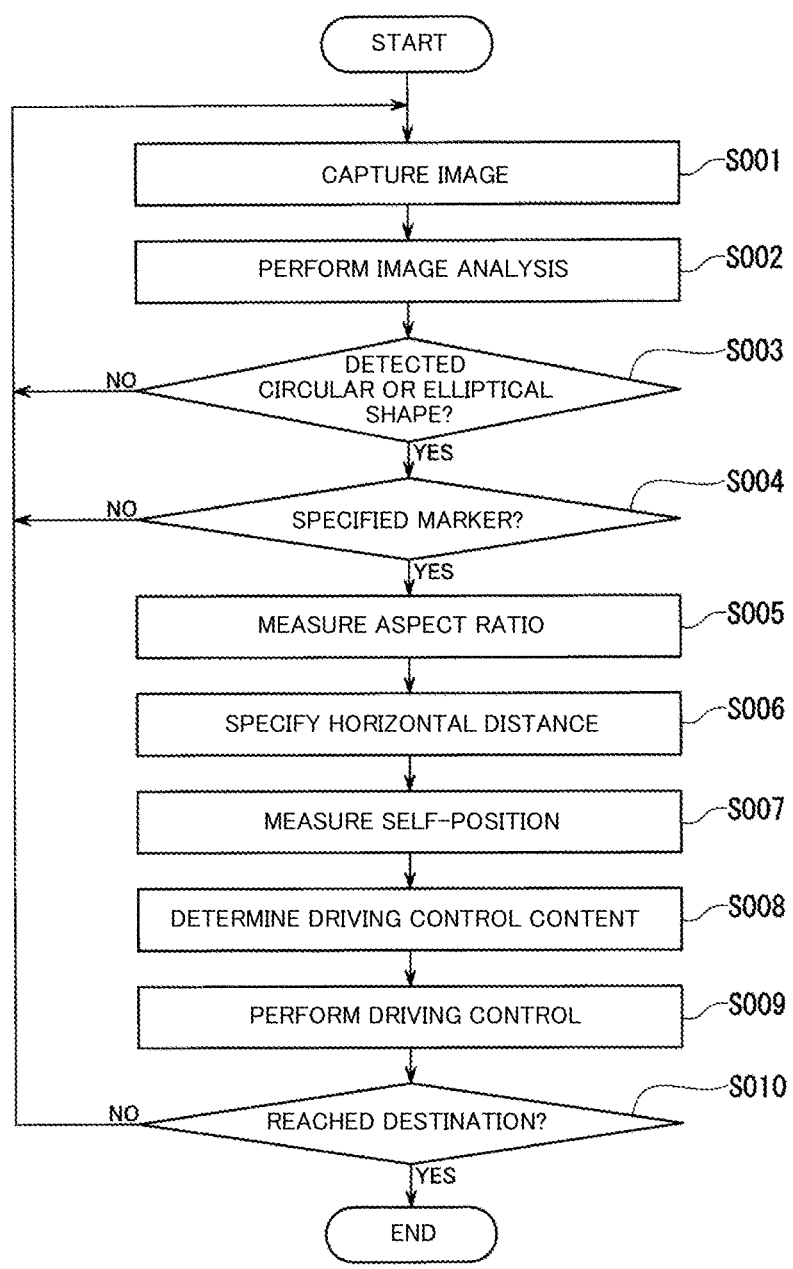
FIG. 6 is a flowchart showing operations of the mobile robot 1 according to the first embodiment of the present invention.

FIG. 6 is a flowchart showing operations of the mobile robot 1 according to the first embodiment of the present invention. The processing in this flowchart starts when the mobile robot 1 starts autonomous travel to the destination point.

The camera 120 captures images of the surroundings of the mobile robot 1 and generates image data (step S001). The image analysis unit 130 performs image analysis on an image based on the image data acquired from the camera 120 (step S002).

If a circular or elliptical area was detected through image analysis (step S003: Yes), the image analysis unit 130 determines whether or not the detected area is a marker 2. If a circular or elliptical area was not detected through image analysis (step S003: No), the camera 120 changes the imaging direction and again captures images of the surroundings of the mobile robot 1 (step S001).

If it was determined that the detected area is an area in which a marker 2 appears, the image analysis unit 130 specifies which marker 2 is appearing based on the information regarding the markers 2 stored in the storage unit 110.

If the marker 2 was specified (step S004: Yes), the image analysis unit 130 measures the aspect ratio of the area where the marker 2 appears (step S005). If a marker 2 was not specified (step S004: No), the camera 120 changes the imaging direction and captures images of the surroundings of the mobile robot 1 again (step S001).

The self-position measuring unit 140 specifies the horizontal distance from the mobile robot 1 to the marker 2 based on information indicating the aspect ratio of the area detected by the image analysis unit 130, and the ceiling height (the height at which the marker 2 is disposed) and the camera installation height that are stored in advance in the storage unit 110 (step S006). The self-position measuring unit 140 measures the self-position based on the specified horizontal distance and the information regarding the position of the marker 2 stored in the storage unit 110 (step S007).

The driving control unit 210 of the drive device 20 determines the driving control content based on the information indicating the self-position measured by the self-position measuring unit 140 and the information indicating the traveling route to the destination point (step S008). The driving control unit 210 causes the mobile robot 1 to travel by controlling the operation of the traveling unit 220 based on the determined driving control content (step S009).

The operations of steps S001 to S009 are repeated (step S010: No) until the destination point is reached. When the mobile robot 1 reaches the destination point (step S010: Yes), the operation of the mobile robot 1 shown in the flowchart of FIG. 6 ends.

Note that it is preferable that the markers 2 are shaped such that the shape of the marker 2 does not change even if rotated about the center position thereof (has a circular outline), such as a circular shape, an annular shape, or a shape in which a plurality of annular rings are concentrically overlapped (e.g., a double circle or a triple circle). This is because, in the case of a circle, the edge is relatively easy to detect, and measurement error is unlikely to occur.

Note that the marker 2 may be a circle formed by a pattern of lines or dots, as long as it does not affect the detection of the aspect ratio when read by an optical sensor such as a camera, and the outer shape may be a circle having a small amount of jaggedness (tessellation).

Modified Examples of First Embodiment

Note that the marker 2 is not limited to being an object, a printed item, or something directly drawn on the ceiling 3 or the like, and may be formed on the ceiling, a wall, or the like by a lighting device (e.g., a circular irradiation area or a circular shadow). For example, the marker 2 may be formed by causing a lighting device to project a combination of circular blocking patterns. Alternatively, the marker 2 may be projected onto a wall surface, a ceiling surface, a floor surface, or the like by an image projection device, as with projection mapping.

Note that the marker 2 is not limited to being formed by visible light, and may be formed by invisible light such as near infrared rays or ultraviolet rays. In this case, the marker 2 is invisible to the naked eye, and therefore the marker 2 can be arranged so as not to aesthetically affect the surrounding environment.

Figure 7:
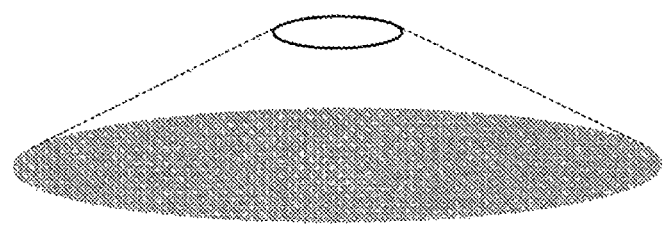
FIG. 7 is a schematic diagram showing an aspect of a marker 1 according to a modified example of the first embodiment of the present invention.

Note that the marker 2 may be displayed by irradiating the marker 2, which is formed using a phosphorescent material, with light, or irradiating a fluorescent marker 2 with excitation light (FIG. 7). As a result, by not displaying the marker 2 in the normal state and displaying the marker 2 with light as needed, it is possible to display the marker 2 for only a certain period of time. In this case, the marker 2 is invisible to the naked eye when position measurement is not performed, and therefore the marker 2 can be arranged so as not to aesthetically affect the surrounding environment.

Figure 8:
FIG. 8 is a schematic diagram showing an aspect of the marker 1 according to a modified example of the first embodiment of the present invention.

Note that the marker 2 is not limited to being an indicator disposed exclusively for position measurement, and an existing circular fixed object or the like may be used as the marker 2. For example, the marker 2 may be a lighting device that has light emitting units arranged in a ring shape (FIG. 8), or a multipoint LED in which LEDs (Light Emitting Diodes) are arranged in a circular or annular shape, for example.

In general, the shapes of downlights, illuminance temperature sensors, smoke detectors, and the like are often circular, and such existing objects can be used as the marker 2. In particular, in the case of a downlight, the lamp and the shade can appear as circular images by adjusting the sensitivity of the camera, and therefore the lamp and the shade can be used as a position indicator for image analysis and position detection.

Note that the marker 2 can be an object made of any material, examples including paper, a plastic sheet, a polymer film material, a metal plate, and a thin film foil.

Note that the marker 2 is not limited to being one continuous object, and may be configured to appear circular due to, for example, combining tile-like or particle-like members in a mosaic pattern.

Figure 9:
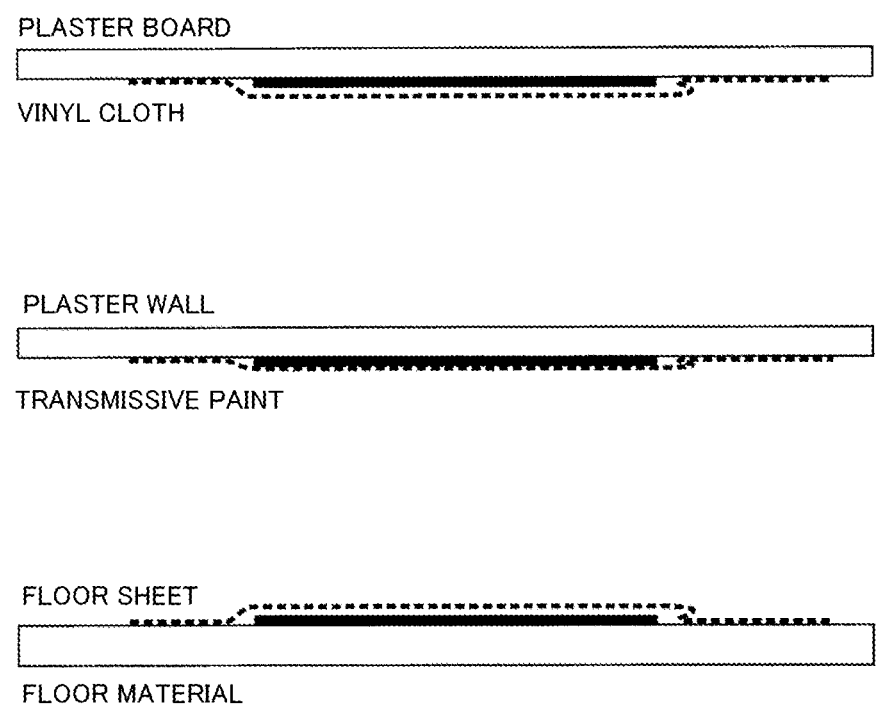
FIG. 9 is a schematic diagram showing an aspect of the marker 1 according to a modified example of the first embodiment of the present invention.

Also note that the marker 2 may be disposed in a state of being covered by a transmissive wallpaper (e.g., vinyl cloth), a transmissive floor sheet, or a transmissive paint (e.g., a light-color transmissive paint) so as not to be out of place with the surroundings (FIG. 9).

In this case, the marker 2 may be disposed in advance on the wall, the floor, or the ceiling during interior work in a facility or a house, for example. For example, the marker 2 may be printed on the back surface of a general wall cloth, or may be pre-printed on an image sheet and attached to the back surface of the wall cloth. Alternatively, the marker 2 may be disposed in advance on a wall, a floor, a ceiling, or the like, and the marker 2 may be covered with wallpaper, a sheet, or paint.

The marker 2 behind the wallpaper, sheet, or paint is visualized by combining the transmissive wallpaper, sheet, or paint with a penetrating lighting device, filter, or the like. As a result, the mobile robot 1 can perform self-position measurement. The penetrating lighting device or filter can be an infrared lighting device, an infrared transmissive filter, or the like. Further, in the visible light region, a lighting device or a filter having a hue that makes it easy to obtain image contrast may be used, for example.

Note that the origin and coordinate axes in the traveling route can be set for each floor, room, corridor, or the like according to the design of the facility or the house, and the mobile robot 1 can travel autonomously based on such coordinate information. In addition, a configuration is possible in which coordinates are set along main movement lines that are used daily in facilities and homes (e.g., a movement line from the bed to the toilet and a movement line from the bed to the living room), and the starting points or the ending points of the movement lines are set as the origin in the traveling route.

Also, a configuration is possible in which coordinates are set along a center line of a corridor on a traveling route that starts from the bedside of the user, which is the starting point of movement, and moves from the bedside to the toilet via the corridor. In this case, the markers 2 are arranged at appropriate intervals along the set coordinates, and the markers 2 are sequentially measured such that the mobile robot 1 can measure the self-position and perform appropriate autonomous traveling.

As described above, the marker 2 can be read by an optical sensor such as a camera, and the relative angle is calculated by measuring the aspect ratio of the read marker 2. Also, the distance from the mobile robot 1 to the marker 2 can be measured based on the size of the read marker 2 (e.g., the longer diameter) and information regarding the installation locations of the markers 2 (e.g., dimensions such as the height and width of the floor, ceiling, and wall).

Note that the linear distance from the camera to the marker 2 can also be calculated by a known method based on focus information of the camera 120, the long-side length of a circular marker on the image sensor, the focal length of the lens, the image sensor size, and the like.

Note that a configuration is possible in which only one marker 2 is arranged at each indicator, or a plurality of markers 2 may be arranged, such as arranging two markers side-by-side. By detecting a plurality of markers 2, the mobile robot 1 can measure the self-position more reliably, for example. Alternatively, the mobile robot 1 can measure the self-position even if a portion of the plurality of placed markers 2 cannot be detected.

Also, driving can be automated or semi-automated based on how the shape of the marker 2 changes in the image due to movement. For example, in a narrow passage, a bent road, a sharp turn, or the like, it is necessary to accurately adjust the distance between a surrounding obstacle and the mobile robot 1 while driving. In this case, with the mobile robot 1 according to the above-described embodiment, image processing and direction identification can be performed easily, thus making it possible to support quick adjustment through real-time control.

Note that by disposing the markers 2 at appropriate intervals along the traveling route, the mobile robot 1 can perform autonomous traveling using the marker 2 as clues. For example, in the space where the mobile robot 1 travels, the markers 2 may be disposed at regular intervals along a safest route (e.g., the center of a corridor and mid points between obstacles).

In this case, the mobile robot 1 travels while successively recognizing the disposed markers 2 and measures deviation between the mobile robot 1 and the traveling route in the vicinity of the markers 2. Then, if the deviation exceeds a set range, the mobile robot 1 may correct the self-position or correct the route by finely adjusting the traveling direction, for example.

Note that the mobile robot 1 may travel autonomously while maintaining a certain distance from a wall surface (a side surface in the space) by measuring the self-position based on markers 2 arranged on the wall surface. Accordingly, the mobile robot 1 can travel at a position close to the wall, thus making it possible to prevent, for example, a plurality of mobile robots 1 from colliding with each other in a space (for example, a corridor).

As described above, the self-position measuring device 10 according to the first embodiment of the present invention includes the camera 120 (image analysis unit) that acquires an image of the surroundings at the self-position, the image analysis unit 130 that detects an area in which a circular shape appears in the image, and a self-position measuring unit 140 that measures the self-position based on a feature amount including an aspect ratio of the area.

Due to having the above configuration, the self-position measuring device 10 can measure the self-position by using a general-purpose imaging device (camera), an existing image analysis algorithm, and an existing character recognition algorithm. In other words, according to the present embodiment, it is not necessary to provide, for example, an ultrasonic radar or triangulation type of distance measuring sensor, an electromagnetic wave type proximity sensor, a special camera image processing device, or the like. Further, according to the present embodiment, it is not necessary to provide a device capable of performing machine learning, GPS, or the like.

As described above, according to the present embodiment, it is not necessary to use expensive devices, and therefore the system can be constructed easily. Also, according to the present embodiment, it is also possible to utilize images from an existing on-board camera such as an obstacle monitoring camera or a drive recorder. As described above, the self-position measuring device 10 according to the first embodiment of the present invention can suppress a decrease in self-position measurement efficiency while also suppressing the device cost.

Also, according to the present embodiment, there is no need to draw a line marker on the floor along a movement line, dispose a light source to serve as a marker, or dispose markers such as two-dimensional bar codes at regular intervals. Accordingly, the self-position measuring device 10 according to the first embodiment of the present invention can suppress a decrease in self-position measurement efficiency while also maintaining the aesthetic appearance.

Second Embodiment

Hereinafter, an embodiment of the present invention will be described with reference to the drawings.

In a second embodiment, single circular markers 2 are disposed as in the first embodiment described above, and additionally, combinations of a marker 2 and another figure (hereinafter, referred to as "supplemental figures") or the like are disposed.

The supplemental figure is given information on the directionality, the position, or the like thereof, for example. As a result, self-position measurement or the like can be performed more easily by the mobile robot 1.

For example, a supplemental figure such as a number, a letter, or a figure may be arranged next to a marker 2. For example, a supplemental image such as a character or a number indicating a position may be arranged next to a marker 2.

Figure 10:
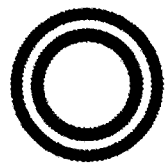
FIG. 10 is a schematic diagram showing an aspect of the marker 2 and a supplemental image according to a second embodiment of the present invention.
Figure 11:
FIG. 11 is a schematic diagram showing an aspect of the marker 2 and a supplemental image according to the second embodiment of the present invention.
Figure 12:
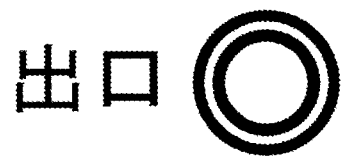
FIG. 12 is a schematic diagram showing an aspect of the marker 2 and a supplemental image according to the second embodiment of the present invention.

For example, FIG. 10 shows an example in which a numerical supplemental image is arranged to the left of a marker 2 having the shape of a double circle. Also, FIG. 11 shows an example in which an alphabetic supplemental image is arranged to the right of a marker 2 having the shape of a double circle. These numerical and alphabetic supplemental images may represent directionality or a position, for example. Also, FIG. 12 shows an example in which a supplemental image made up of Chinese characters is arranged to the left of a marker 2 having the shape of a double circle. In this way, the supplemental image may be a phrase that itself expresses the directionality, position, or the like.

Figure 13:
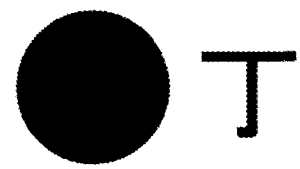
FIG. 13 is a schematic diagram showing an aspect of the marker 2 and a supplemental image according to the second embodiment of the present invention.
Figure 14:
FIG. 14 is a schematic diagram showing an aspect of the marker 2 and a supplemental image according to the second embodiment of the present invention.
Figure 15:
FIG. 15 is a schematic diagram showing an aspect of the marker 2 and a supplemental image according to the second embodiment of the present invention.
Figure 16:
FIG. 16 is a diagram for describing dual usage of the marker 2 and an existing marker according to the second embodiment of the present invention.
Figure 17:
FIG. 17 is a diagram for describing dual usage of the marker 2 and an existing marker according to the second embodiment of the present invention.
Figure 18:
FIG. 18 is a diagram for describing dual usage of the marker 2 and an existing marker according to the second embodiment of the present invention.
Figure 19:
FIG. 19 is a diagram for describing dual usage of the marker 2 and an existing marker according to the second embodiment of the present invention.

Also, FIG. 13 shows an example in which a Chinese character supplemental image is arranged to the right of a marker 2 shaped as a filled circle. Also, FIG. 14 shows an example in which a supplemental image of a symbol indicating directionality (an arrow) is arranged to the right of a marker 2 shaped as a filled circle. Further, FIG. 15 shows an example in which a supplemental image of a Chinese character meaning "toilet" is arranged to the right of a marker 2 shaped as a filled circle.

The positional relationship between the marker 2 and the supplemental figure in an acquired image and the information expressed by the supplemental figure (e.g., a numerical value or text information) may be read by an image recognition algorithm (e.g., OCR). Accordingly, it is possible to identify each marker 2 and obtain the position information (absolute coordinates) of the marker 2, and also calculate the relative coordinates of the marker 2 and the mobile robot.

Note that the marker 2 can also be used as another indicator installed in a facility, a house, or the like. For example, a simplified humanoid design for usage as a sign is often a design in which the head is generally drawn with a circle and combined with a body-like figure (FIGS. 16 to 19). In this case, the circular head can be used as a marker 2. By using a figure as both a marker 2 for motion control and a humanoid sign, the marker 2 can be provided without looking out of place (without spoiling the aesthetic appearance of the surroundings).

Note that the closer the mobile robot 1 is to the marker 2, the closer the aspect ratio of the area in which the marker 2 appears in the image becomes to 1. Accordingly, the mobile robot 1 can recognize that it is approaching (is directly below) the marker 2. On the other hand, this approach makes it more difficult to calculate the relative angle and detect the direction. However, if a combination of a marker 2 and a supplemental figure is used, the positional relationship (angle) between the marker 2 and the supplemental figure can be used to easily calculate the distance and the relative angle between the mobile robot 1 and the marker 2, and perform direction calculation.

For example, it is possible to measure the deviation of the angle between the traveling route indicated by the marker 2 and the traveling direction of the mobile robot based on the inclination of a line that connects the center point of the marker 2 and the center point of the supplemental image. Note that the center point can be specified by using a conventional image recognition technique, for example. Further, deviation from the traveling route, the self-position, and the like can be measured based on the detection of the vertical and horizontal axes of the supplemental image or the position coordinates of the marker 2 in the image.

Figure 20:
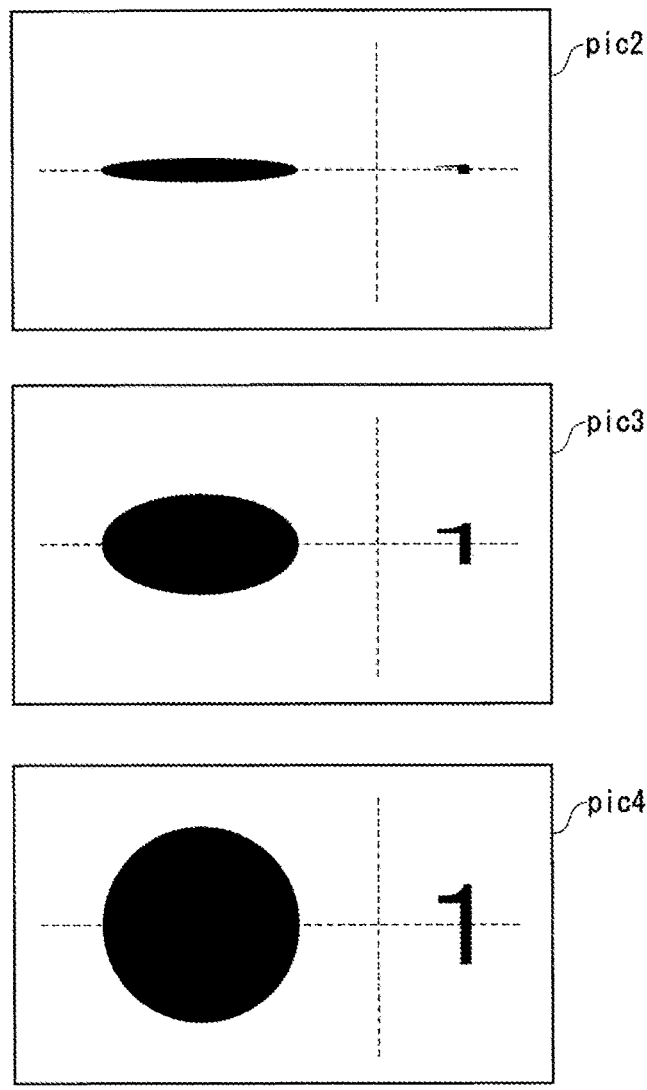
FIG. 20 is a diagram showing an example of images acquired by the mobile robot 1 according to the second embodiment of the present invention.

For example, when the mobile robot 1 is traveling, the images change in order from an image pic2 to an image pic3, and then from the image pic3 to an image pic4, as shown in FIG. 20. At this time, if the mobile robot 1 is traveling along the correct traveling route, the line that connects the center point of the marker 2 and the center point of the supplemental image is always horizontal (e.g., parallel with image frame), and is always at the center position in the image.

Figure 21:
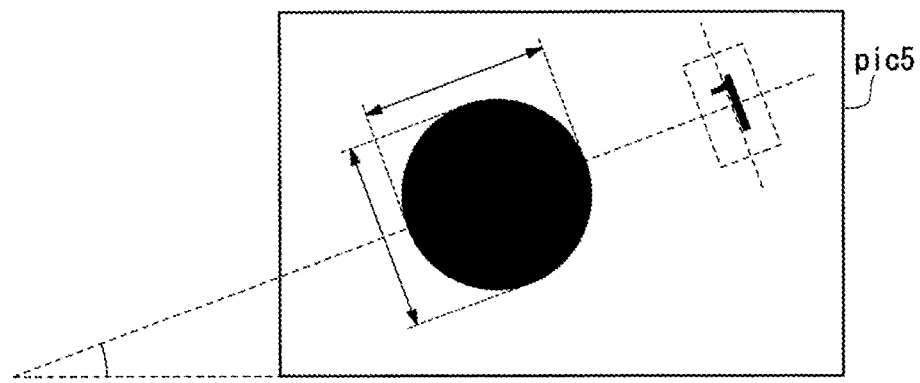
FIG. 21 is a diagram showing an example of an image acquired by the mobile robot 1 according to the second embodiment of the present invention.

However, if the captured image is, for example, an image pic5 shown in FIG. 21, the marker 2 appears to be a perfect circle, and therefore the mobile robot 1 can recognize that it is directly below the marker 2 (i.e., at a position on the traveling route). On the other hand, in the image pic5, the line connecting the center point of the marker 2 and the center point of the supplemental image is inclined, and therefore the mobile robot 1 can recognize that the traveling direction has deviated.

Figure 22:
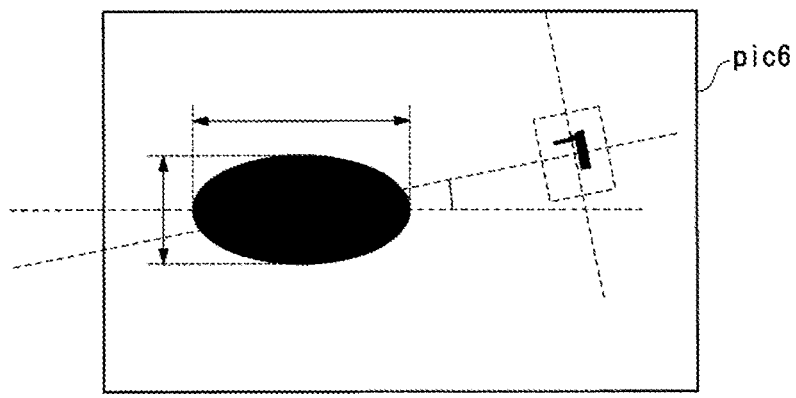
FIG. 22 is a diagram showing an example of an image acquired by the mobile robot 1 according to the second embodiment of the present invention.
Figure 23:
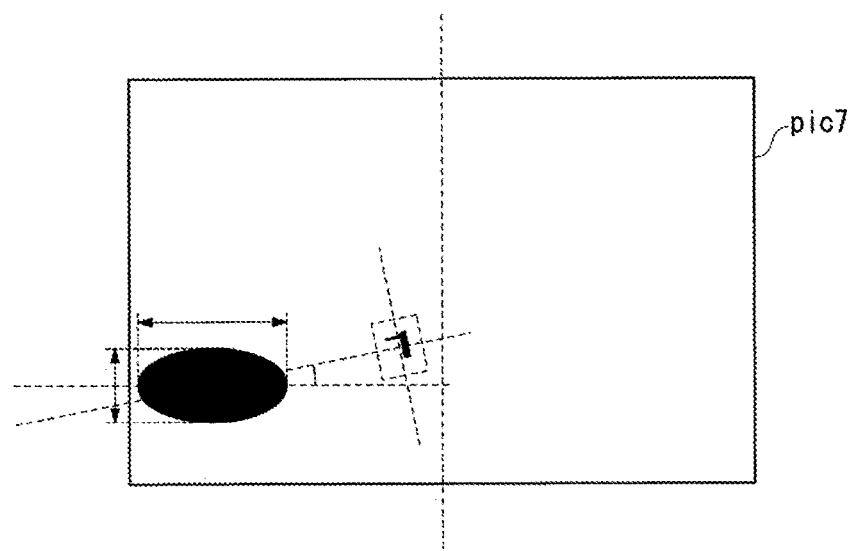
FIG. 23 is a diagram showing an example of an image acquired by the mobile robot 1 according to the second embodiment of the present invention.

Also, if the captured image is, for example, an image pic6 shown in FIG. 22 or an image pic7 shown in FIG. 23, the marker 2 appears to be elliptical, and therefore the mobile robot 1 can recognize that the self-position is not directly under the marker 2. In addition, the line connecting the center point of the marker 2 and the center point of the supplemental image is inclined, and therefore the mobile robot 1 can recognize that the traveling direction has deviated, and can recognize that the self-position has deviated from the traveling route.

Further, in the case of the image pic7 shown in FIG. 23, unlike the case of the above image pic6, the position of the marker 2 in the image has not been maintained at the center position, and therefore the mobile robot 1 can recognize that it is traveling in a direction different away from where the marker 2 is located. Accordingly, the mobile robot 1 can recognize that the traveling direction needs to be corrected immediately, for example.

By arranging a supplemental image next to a marker 2 in this way, it is possible to perform more accurate driving control based not only on the information given to the supplemental image but also on the positional relationship between the marker 2 and the supplemental image.

The self-position measuring device 10 and the driving control unit 210 in the above-described embodiments may be realized by a computer. In this case, a program for realizing this functionality may be recorded on a computer-readable recording medium, and the program recorded on the recording medium may be read by a computer system and executed to realize the present invention. Note that the term "computer system" as used herein includes an OS and hardware such as a peripheral device. Also, the term "computer-readable recording medium" refers to a portable medium such as a flexible disk, a magneto-optical disk, a ROM, or a CD-ROM, or a storage device such as a hard disk built in a computer system. Further, the "computer-readable recording medium" may include the case of dynamically holding a program for a short period of time, such as a communication line for transmitting a program via a network such as the Internet or a communication line such as a telephone line, and may also include the case of holding a program for a certain period of time, such as a volatile memory inside a computer system that serves as a server or a client in such a case. Further, the above program may be for realizing a portion of the above-mentioned functions, may be realized by combining the above-mentioned functions with a program already recorded in a computer system, and may be realized by using a programmable logic device such as FPGA (Field Programmable Gate Array).

REFERENCE SIGNS LIST

1 Mobile robot
2 Marker
3 Ceiling
4 Floor surface
10 Self-position measuring device
20 Drive device
100 Control unit
110 Storage unit
120 Camera
130 Image analysis unit
140 Self-position measuring unit
210 Driving control unit
220 Traveling unit

The invention claimed is:
1. A position measurement method comprising:
an image acquiring step of acquiring an image of surroundings at a self-position;

an image analyzing step of detecting an area in which a circular shape appears in the image; and a self-position measuring step of measuring the self-position based on a feature amount including an aspect ratio of the area, wherein in the self-position measuring step, a relative angle between a direction of the circular shape and a traveling direction is calculated based on the aspect ratio.

2. The position measurement method according to claim 1, wherein in the self-position measuring step, a distance from the self-position to the circular shape is measured based on a size of the area.

3. A driving control method comprising:

an image acquiring step of acquiring an image of surroundings at a self-position;

an image analyzing step of detecting an area in which a circular shape appears in the image;

a self-position measuring step of measuring the self-position based on a feature amount including an aspect ratio of the area; and a driving controlling step of controlling autonomous traveling based on the measured self-position, wherein in the driving controlling step, the autonomous traveling is controlled such that a distance from a wall surface is maintained at a predetermined distance.

4. A driving control system comprising:

a self-position measuring device, the self-position measuring device including:

an image acquisition unit configured to acquire an image of surroundings at a self-position;

an image analysis unit configured to detect an area in which a circular shape appears in the image; and a self-position measuring unit configured to measure the self-position based on a feature amount including an aspect ratio of the area; and a driving control device, the driving control device including:

a driving control unit configured to control traveling based on the self-position measured by the self-position measuring unit, wherein the self-position measuring unit is configured to calculate a relative angle between a direction of the circular shape and a traveling direction based on the aspect ratio.

5. The driving control method according to claim 3, wherein in the self-position measuring step, a relative angle between a direction of the circular shape and a traveling direction is calculated based on the aspect ratio.

6. The driving control method according to claim 3, wherein in the self-position measuring step, a distance from the self-position to the circular shape is measured based on a size of the area.

7. The driving control system according to claim 4, wherein the self-position measuring unit is configured to measure a distance from the self-position to the circular shape based on a size of the area.

8. The driving control system according to claim 4, wherein the driving control unit is configured to control autonomous traveling such that a distance from a wall surface is maintained at a predetermined distance.

9. The position measurement method according to claim 1, wherein the area in which the circular shape appears in the image corresponds to a marker, and the marker is provided at a ceiling of a room.

10. The position measurement method according to claim 9, wherein the room has a plurality of the ceilings having different heights, and the plurality of the ceiling have a plurality of the markers having different configurations, respectively.

11. The driving control method according to claim 3, wherein the area in which the circular shape appears in the image corresponds to a marker, and the marker is provided at a ceiling of a room.

12. The driving control method according to claim 11, wherein the room has a plurality of the ceilings having different heights, and the plurality of the ceiling have a plurality of the markers having different configurations, respectively.

13. The driving control system according to claim 4, wherein the area in which the circular shape appears in the image corresponds to a marker, and the marker is provided at a ceiling of a room.

14. The driving control system according to claim 13, wherein the room has a plurality of the ceilings having different heights, and the plurality of the ceiling have a plurality of the markers having different configurations, respectively.

* * * * *